United States Patent
Mustafa et al.

(10) Patent No.: US 9,435,477 B2
(45) Date of Patent: Sep. 6, 2016

(54) CREATING THERMAL UNIFORMITY IN HEATED PIPING AND WELDMENT SYSTEMS

(76) Inventors: Sami Mustafa, Menlo Park, CA (US); Damon R. Wytcherley, San Jose, CA (US)

( * ) Notice: Subject to any disclaimer, the term of this patent is extended or adjusted under 35 U.S.C. 154(b) by 1087 days.

(21) Appl. No.: 13/427,861

(22) Filed: Mar. 22, 2012

(65) Prior Publication Data

US 2012/0241124 A1 Sep. 27, 2012

Related U.S. Application Data

(60) Provisional application No. 61/466,425, filed on Mar. 22, 2011.

(51) Int. Cl.
*H05B 3/58* (2006.01)
*F16L 53/00* (2006.01)

(52) U.S. Cl.
CPC .............. *F16L 53/008* (2013.01); *H05B 3/58* (2013.01); *H05B 2203/021* (2013.01); *H05B 2203/022* (2013.01)

(58) Field of Classification Search
CPC .............. H05B 3/58; H05B 2203/021; H05B 2203/022; F16L 53/008
USPC ........ 392/465, 470, 478; 219/535; 165/11.1; 138/149
See application file for complete search history.

(56) References Cited

U.S. PATENT DOCUMENTS

| | | | | |
|---|---|---|---|---|
| 2,996,594 A * | 8/1961 | Tuttle | ............................ | 219/544 |
| 3,304,408 A * | 2/1967 | Finch et al. | .................. | 219/544 |
| 3,315,681 A * | 4/1967 | Poppendiek | .................. | 607/106 |
| 3,548,158 A * | 12/1970 | McCaskill | .................... | 219/530 |
| 3,632,979 A * | 1/1972 | McCrink | ....................... | 392/478 |
| 3,677,329 A * | 7/1972 | Kirkpatrick | .............. | 165/104.26 |
| 3,863,701 A * | 2/1975 | Niimi et al. | ................... | 164/98 |
| 3,970,823 A * | 7/1976 | Volk, Jr. | ........................ | 219/546 |
| 3,984,980 A * | 10/1976 | Wise | .............................. | 60/517 |
| 4,110,599 A * | 8/1978 | Offermann | .................... | 392/469 |
| 4,180,723 A * | 12/1979 | Szupillo | ........................ | 219/541 |
| 4,192,988 A * | 3/1980 | Pederson et al. | ............ | 219/201 |
| 4,455,017 A * | 6/1984 | Wunsche | ...................... | 266/190 |
| 4,570,055 A * | 2/1986 | McMills | ....................... | 219/541 |
| 4,847,469 A * | 7/1989 | Hofmann et al. | ........... | 392/397 |
| 5,003,163 A * | 3/1991 | Jensen | ......................... | 219/535 |
| 5,117,094 A * | 5/1992 | Jensen | ......................... | 219/535 |
| 5,381,511 A * | 1/1995 | Bahar et al. | ................. | 392/472 |
| 5,409,669 A * | 4/1995 | Smith et al. | .................. | 422/174 |
| 5,615,805 A * | 4/1997 | Yoncak | ....................... | 222/146.5 |
| 5,639,394 A * | 6/1997 | Conley | ........................ | 219/535 |
| 6,116,290 A * | 9/2000 | Ohrn et al. | .................. | 138/149 |
| 6,353,211 B1* | 3/2002 | Chen | ............................. | 219/527 |
| 2003/0197006 A1* | 10/2003 | Martinez et al. | ............ | 219/535 |
| 2003/0218006 A1* | 11/2003 | Sutorius | ....................... | 219/535 |

(Continued)

*Primary Examiner* — Dana Ross
*Assistant Examiner* — Joseph Iskra
(74) *Attorney, Agent, or Firm* — Law Office of Dorian Cartwright; Dorian Cartwright

(57) ABSTRACT

A piping system comprises a resistive heating circuit, a target heating surface, and a thermally conductive substrate adjoin (or abutting) both the heating circuit and the heating surface. The thermally conductive substrate can be composed of aluminum or some other material for heat spreading. A material for heat spreading has a thermal conductivity sufficient to evenly heat a section of the target surface within tolerance requirements of a sensitive application. The even heating can eliminate hot spots and cold spots of a temperature gradient along an axis of the piping system.

16 Claims, 4 Drawing Sheets

(56) References Cited

U.S. PATENT DOCUMENTS

| | | | |
|---|---|---|---|
| 2003/0223688 A1* | 12/2003 | Zhao | 385/37 |
| 2005/0109758 A1* | 5/2005 | Neal et al. | 219/386 |
| 2006/0193613 A1* | 8/2006 | Kertesz | 392/480 |
| 2007/0045275 A1* | 3/2007 | Steinhauser et al. | 219/228 |
| 2007/0143914 A1* | 6/2007 | Shirai et al. | 4/420.2 |
| 2007/0187069 A1* | 8/2007 | Ueno et al. | 165/80.3 |
| 2009/0220223 A1* | 9/2009 | Colosimo et al. | 392/468 |
| 2010/0126986 A1* | 5/2010 | Gunzing et al. | 219/643 |
| 2010/0163550 A1* | 7/2010 | Belsh et al. | 219/634 |
| 2010/0269917 A1* | 10/2010 | Schild et al. | 137/341 |
| 2010/0290764 A1* | 11/2010 | Borgmeier et al. | 392/468 |
| 2011/0056931 A1* | 3/2011 | Schlipf | 219/548 |
| 2011/0308709 A1* | 12/2011 | Ouellette | 156/172 |

\* cited by examiner

CREATING THERMAL UNIFORMITY IN HEATED PIPING AND WELDMENT SYSTEMS

CROSS-REFERENCE TO RELATED APPLICATIONS

This application claims priority under 35 USC 119(e) to U.S. App. No. 61/466,425, by Sami Mustafa et al., filed on Mar. 22, 2011, entitled CREATING THERMAL UNIFORMITY IN HEATED PIPING AND WELDMENT SYSTEMS, the entire contents being hereby incorporated by reference in its entirety

BACKGROUND

1. Technical Field

Embodiments of the invention relate generally to a heating circuit, and more specifically, incorporating a thermally conductive substrate between the heating circuit and a target heating surface.

2. Prior Art

Piping and weldment systems that must operate at higher than ambient temperatures are typically heated using some sort of electrical resistance heater circuit. These circuits are held in close proximity to the target surfaces, and are typically insulated using some material wrapped around the outside, such as silicone rubber or fiberglass. In industrial applications, this insulation material serves several purposes including physical protection of the heater circuit from the environment, improving electrical and thermal efficiency by reducing thermal losses to the environment, increasing heater circuit life by reducing the chance of over-temperature and failure of the electrical resistance material, and improving personnel safety by reducing the touch temperature on the outside surface of the heated system.

Certain materials with low thermal K factors used as insulation will improve the above effects, but heat losses and thermal loading of the piping system and the components included in the system will effect the thermal uniformity from one point in the system to another, and unless the insulation is "perfect," it alone is insufficient to provide the thermal uniformity across the system that is required in the semiconductor industry. The difference from high to low temperature across a system becomes worse as the operating temperature set point increases. Additionally, lack of thermal uniformity is compounded by the imperfection of the heater resistance element due to it's inherent hot and cold spots.

Electrical resistance heaters utilize a heat sink to be closely engaged with the heater surface for proper operation and longest service life. If the heater is allowed to operate in "open air," it can overheat and fail much more quickly than if it is in intimate thermal contact with a heat sink. This accelerated failure mechanism becomes more prevalent as the operating temperature set point increases, especially as the thermal limits of the materials employed in the assembly are approached.

In high tech industries such as the semiconductor manufacturing sector, much finer uniformity is often required, with typical expectations on the order of plus or minus five degrees C. at a set point of up to 200 degrees C. Though it may be theoretically possible to achieve this level of uniformity using traditional heater construction methods, several iterations of the design may be required and the results lack manufacturing repeatability. Additionally, traditional heater construction often lead to very complex heater system design and finely controlled thermal balancing that can be affected by and thrown off by unpredictable changing environmental conditions.

Additionally, high tech industries are demanding that heated systems operate at higher and higher temperatures, often pushing the envelope for materials capability.

Thermal system designers require better methods for protecting the heaters, especially at higher operating temperature ranges, and for creating the desired high level of thermal uniformity.

SUMMARY

The above-mentioned needs are met by a method, article of manufacture, and a method of manufacturing for incorporating a thermally conductive substrate between an electrical resistance heater and a target heating surface for uniform heating.

In one embodiment, a piping system comprises a resistive heating circuit, a target heating surface, and a thermally conductive substrate adjoining (or abutting) both the heating circuit and the heating surface. The thermally conductive substrate can be composed of aluminum or some other material for heat spreading.

In another embodiment, a material for heat spreading has a thermal conductivity sufficient to evenly heat a section of the target surface within tolerance requirements of a sensitive application. The even heating can eliminate hot spots and cold spots of a temperature gradient along an axis of the piping system.

In yet another embodiment, an insulator surrounds a surface of the heating circuit.

In still another embodiment, the heating circuit increases a temperature of gas or fluid being transported through the piping system.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

A method, an article of manufacture, and a method of manufacturing, is disclosed, for incorporating a thermally conductive substrate between an electrical resistance heater and a target heating surface. By employing this method, electrical resistance heaters can operate more safely at higher temperatures, with more uniformity, and system thermal uniformity is greatly enhanced. The following detailed description is intended to provide example implementations to one of ordinary skill in the art, and is not intended to limit the invention to the explicit disclosure, as one of ordinary skill in the art will understand that variations can be substituted that are within the scope of the invention as described.

Figure 1:
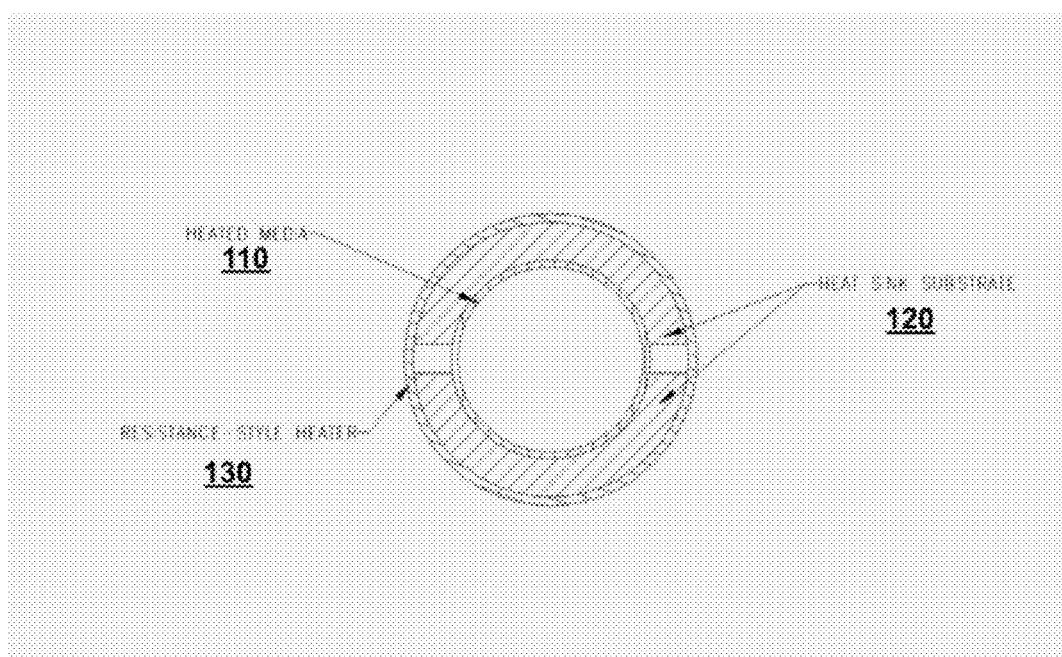
FIG. 1 is a schematic diagram showing a cross-section view of a pipe, perpendicular to an axis, having a thermally conductive substrate, according to an embodiment of the present invention.

FIG. 1 is a schematic diagram showing a cross-section view of a pipe 100 (or weldment system), perpendicular to an axis, having a thermally conductive substrate according to an embodiment of the present invention. The pipe can be used to transport a heated media 110 (or a substrate) such as gas, fluid, or mobile solids. A heat sink substrate 120 (or thermally conductive substrate) transports heat from a resistance-style heater 130 (or resistance heating circuit) to a heated media (or target heating surface such as a media carrier composed of PFA-type plastic or stainless steel). In one embodiment, the resistance-style heater 130 is a thermocoupler.

The pipe 100 is heated to mitigate condensation within the lines, for more uniform delivery of the substance. The pipe is adapted for use in sensitive applications, such as a clean room in which delivery of gaseous doping agents in CVD, MOCVD or LPCVD processes, wafer cleaning processes, are used in the manufacture of LEDs, LCDs and other components. This application is particularly sensitive due to the microscopic size of electrical circuits generated in a clean room which have a low tolerance for variations in media temparture. Other exemplary implementations include medical applications, such as heated PFA lines and tubing for dialysis machines, and a thermal angel for a blood transfusion. One of ordinary skill in the art will recognize that many other applications are possible.

In some embodiments, the pipe 100 is a section of a piping system. A piping specialist can modify an off-the shelf the pipe. Also, a manufacturer can assemble and produce the pipe 100 as a finished product. These modified pipes can then be delivered on-site and installed for a particular application.

Figure 2:
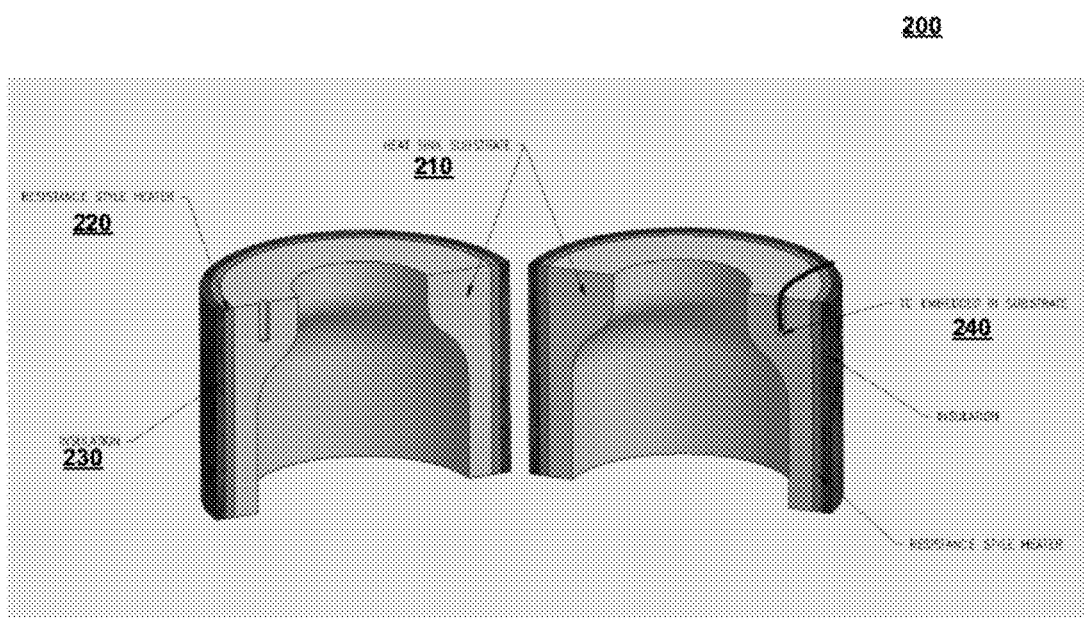
FIG. 2 is a schematic diagram showing a cross section view of a pipe, along an axis, having a thermally conductive substrate, according to an embodiment of the present invention.

FIG. 2 is a schematic diagram showing a perspective view of a pipe 200 with a heater assembly, along an axis, having a thermally conductive heat sink substrate 210 according to an embodiment of the present invention. Both horizontal and vertical cross-sections are shown in the perspective view. In one embodiment, a heat sink substrate 210 does not have a uniform thickness. Therefore, the heater substrate can be built to conform to non-uniform surfaces and ensure that they are heated evenly.

In some embodiments, an outer surface of the pipe 200 is substantially even despite the non-uniformity of the inner surface. The inner surface can be uneven as a result of a joint between two members, or an elbow. Also, circumference can change in order to create an increased or reduced pressure on the media.

A thermocouple 240 is embedded in the heat sink substrate 210. A hole can be bored during retrofitting of an off the shelf pipe, or pre-bored during manufacture. By moving the thermocouple 240 away from the resistance-style heater 220, a better temperature reading is taken. Additionally, an epoxy can be used to backfill a boring cavity, for an even better temperature reading.

In one embodiment, the resistance-style heater 220 is permanently bonded directly to a substrate. As a result, the resistance-style heater 220 remains engaged with a heat sink in a manner that eliminates hot-spots along the heater circuit. Additionally, an expected service life of the heater circuit can be extended. A heater control (not shown) can receive a feedback signal from the thermocouple 240 and adjust the resistance-style heater 220 as needed to maintain a target temperature.

In one embodiment, insulation 230 is then used around the outside of the heater for physical protection of the resistance-style heater 220 and for plant safety and to prevent heat loss. But the insulation 230 becomes less important to creating thermal uniformity than is the case in a system without a substrate.

In another embodiment, a substrate is custom-shaped to conform to a target surface. For example, an inside diameter of the substrate to exactly conform to the outside diameter of the target piping system (see FIG. 1) This system is designed in a clam-shell arrangement that is clamped around the outside of the target piping or weldment system, allowing easy removal for system repair or maintenance.

Figure 3:
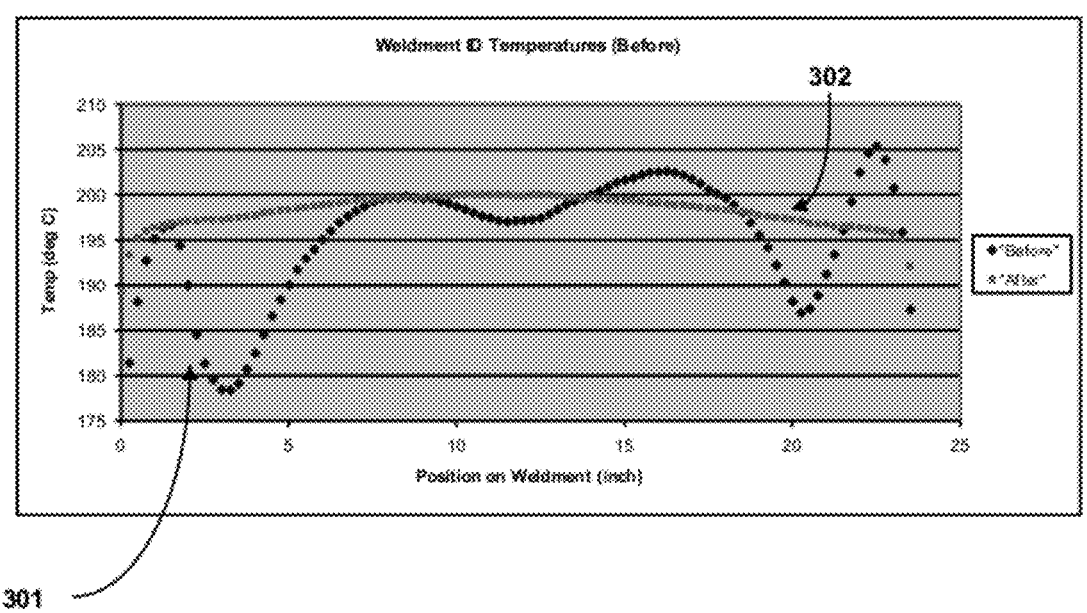
FIG. 3 is a chart illustrating a heating gradient of a conventional pipe of the prior art compared to a heating gradient of a piping system having a thermally conductive substrate, according to an embodiment of the present invention.

FIG. 3 is a chart illustrating a comparison of heating gradients. Line 301 represents a conventional piping system while line 302 represents a piping system having a thermally conductive substrate. As can be seen, the dramatic hot and cold spots of line 301 are substantially eliminated or reduced in line 302. Thus, the improved piping system of line 302 is far more uniform and predictable. In one embodiment, when employed in a high-tech fluid or gas delivery system, the piping system will meet the required design criteria for both temperature control and thermal uniformity. One important design criteria can be related to temperature variation along an axis of the piping system.

Improvements in thermal uniformity are dramatic and instantly recognizable. In FIG. 3, the thermal profile across a typical heated weldment piping system employing traditional electrical resistance heat with silicone-rubber insulation is shown in line 301. Large peaks and valleys were measured, which correspond to hot spots along the heater circuit and to cold spots in the flow path. These hot spots represent likely failure points as the electrical resistance heater can be driven beyond the material's safe operating temperature, and the cold spots represent locations where the conditions of the process fluids flowing through the piping system could fall below the desired operating band.

Another advantage to this design approach is that since the thermal profile is flattened across the entire heated system, thermal performance is more predictable and accurate thermal models can be created. This allows the system designer to create custom thermal profiles, such as a system with one end or portion colder than another.

In one embodiment, the piping system is used for applications with relatively tight tolerance levels, such as semiconductor processing. Precise and linear thermal gradients can be created using this approach, allowing a predictable rise from one target temperature to another within a system. When using conventional heating methods this sort of flexibility is only possible by employing multiple control zones, sophisticated temperature controllers, and accepting the wide uniformity swings inherent to conventional heating methods.

Figure 4:
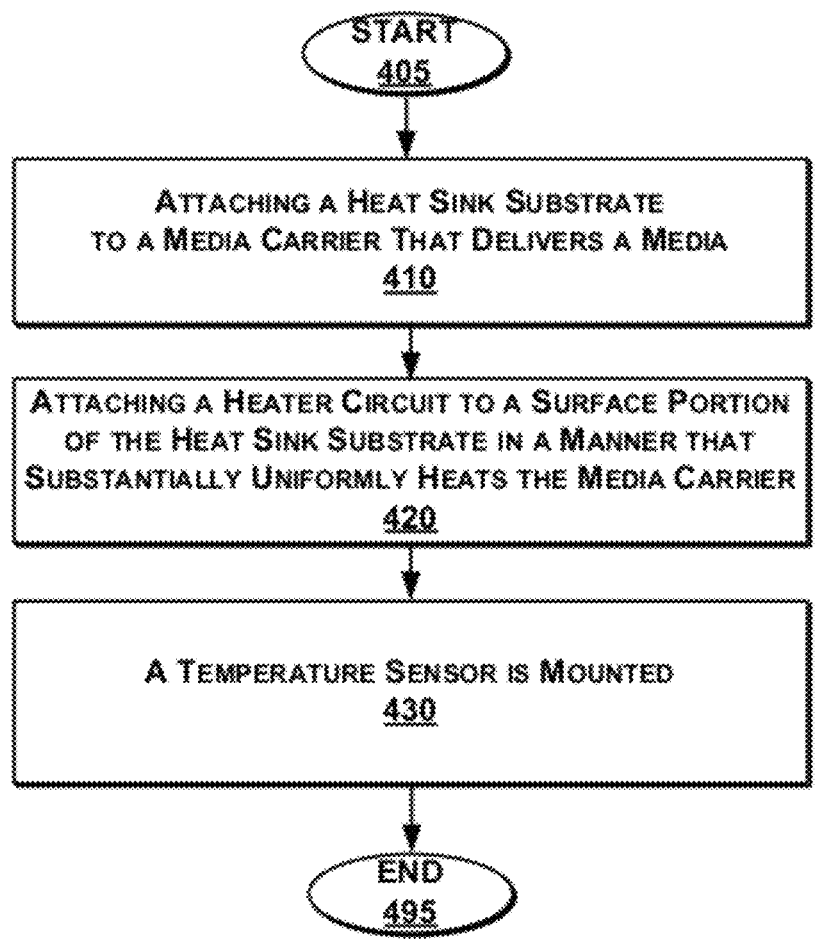
FIG. 4 is a flow chart illustrating a method for creating thermal uniformity in a heated media delivery system, according to an embodiment of the present invention.

FIG. 4 is a flow chart illustrating a method 400 for creating thermal uniformity in a heated media delivery system, according to an embodiment of the present invention.

At step 410, a heat sink substrate is attached to a media carrier that delivers a media such a gas, liquid, or a mobile solid.

At step 420, a heater circuit is attached to a surface portion of the heat sink substrate in a manner that substantially uniformly heats the media carrier. In turn, the substance itself is substantially uniformly heated as well.

At step 430, a temperature sensor is mounted. The temperature sensor can be mounted to allow a more uniform reading of the temperature. In particular, some temperature sensors are typically mounted with the heating element. The heating element has different contours of hot and cold spots depending how far away the temperature is from a wire carrying the heat.

In one implementation of the current invention, a hole is bored within heat sink substrate. By placing probes of the temperature sensor within the bored holes, away from hot and cold spots, a more accurate temperature reading is taken. The temperature reading is less affected by whether the heater circuit is currently heating or cooling, and by coil patterns of the heater circuit. In still another embodiment, the bored hole is then backfilled with an epoxy or other suitable substance to remove any air pocket that may introduce inaccuracies to the temperature reading.

Example Specifications:

In one embodiment, electrical resistance heater insulated with silicone rubber, Kapton polyimide, polyester film or any other appropriate electrical insulator. Operating temperature range is from ambient to approx. 300 degrees C.

Substrate material can be Aluminum or Aluminum alloys, Copper or copper alloys, carbon fiber, thermally conductive plastic or other thermally conductive rigid or semi-rigid material suitable to the required temperature range of the system.

Insulation can be made from silicone rubber, fiberglass, polyimide or other materials as required by physical and thermal design criteria.

Electrical power requirements can be anything required by the application. Typical voltage range is 12 VDC to 240 VAC, and typical power ranges from fractional wattage to hundreds of watts.

Measurement and control is accomplished using integrated temperature sensors, thermostats, thermal fuses and other devices as required by the application.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention.

We claim:

1. A method for creating thermal uniformity in a heated piping system delivering gas or liquid to applications, comprising:

attaching a heat sink substrate to at least a section of the piping system that delivers uniformly heated gas or liquid passing through the piping system, wherein the heat substrate is formed from a material that heat spreads according to a thermal conductivity of the material, and wherein the heat sink substrate has a non-uniform thickness to conform to a non-uniform diameter of the section of the piping system;

attaching a heater circuit to an outer surface portion of the heat sink substrate for delivering heat to the gas or liquid on an inner surface portion of the heat sink substrate, wherein the heater circuit comprises a pattern that inherently produces hot and cold spots that are smoothed by heat spreading of the heat sink substrate to apply heat to the gas or liquid within tolerance requirements of an application;

mounting a temperature sensor within the thickness of the heat sink substrate, with feedback to the heat controller, for measuring a temperature near the inner surface portion of the heat sink substrate as provided by the heater circuit on the outer surface; and adjusting the heater circuit at the outer surface portion by the heat controller responsive to the measurements at the inner surface portion.

2. The method of claim 1, further comprising:
boring a cavity into the heat sink substrate; and
submerging the temperature sensor into the cavity.

3. The method of claim 1, further comprising:
bonding the heater circuit to the heat sink substrate.

4. The method of claim 1,
wherein the media carrier is composed of PFA-type plastic.

5. The method of claim 1,
wherein the media carrier is composed of stainless steel.

6. The method of claim 1, further comprising:
providing a feedback signal from the temperature sensor to a heater control that adjusts the heater circuit accordingly.

7. The method of claim 1, wherein the media comprises at least one of a gas, a liquid, or a mobile solid.

8. A heated piping system for thermal uniformity for gas or liquid delivered to applications, comprising:

a heat sink substrate attached to at least a section of the piping system that delivers uniformly heated gas or liquid passing through the piping system, wherein the heat substrate is formed from a material that heat spreads according to a thermal conductivity of the material, and wherein the heat sink substrate has a non-uniform thickness to conform to a non-uniform diameter of the section of the piping system;

a heater circuit attached to an outer surface portion of the heat sink substrate for delivering heat to the gas or liquid on an inner surface portion of the heat sink substrate, wherein the heater circuit comprises a pattern that inherently produces hot and cold spots that are smoothed by heat spreading of the heat sink substrate to apply heat to the gas or liquid within tolerance requirements of an application; and a temperature sensor mounted within the thickness of the heat sink substrate, with feedback to the heat controller, for measuring a temperature near the inner surface portion of the heat sink substrate as provided by the heater circuit on the outer surface; wherein the heater circuit is adjusted at the outer surface portion by the heat controller responsive to the measurements at the inner surface portion.

9. The piping member of claim 8, wherein a cavity is bored into the heat sink substrate, and the temperature sensor is submerged into the cavity.

10. The method of claim 1, wherein the heater circuit is bonded to the heat sink substrate.

11. The piping member of claim 8,
wherein the heat sink substrate is of non-uniform thickness corresponding to non-uniform shape of the media carrier, and an outer surface of the heat sink substrate is of uniform thickness.

12. The piping member of claim 8,
wherein the media carrier is composed of PFA-type plastic.

13. The piping member of claim 8,
wherein the media carrier is composed of stainless steel.

14. The piping member of claim 8, further comprising:
a heater control to receive a feedback signal from the temperature sensor, the heater control adjusting the heater circuit accordingly.

15. The method of claim 1, wherein the heating substrate is attached to the piping section in a clam-shell arrangement allowing removal for repair or maintenance.

16. The method of claim 1, wherein the application comprises semiconductor processing.

* * * * *